Figure 1:
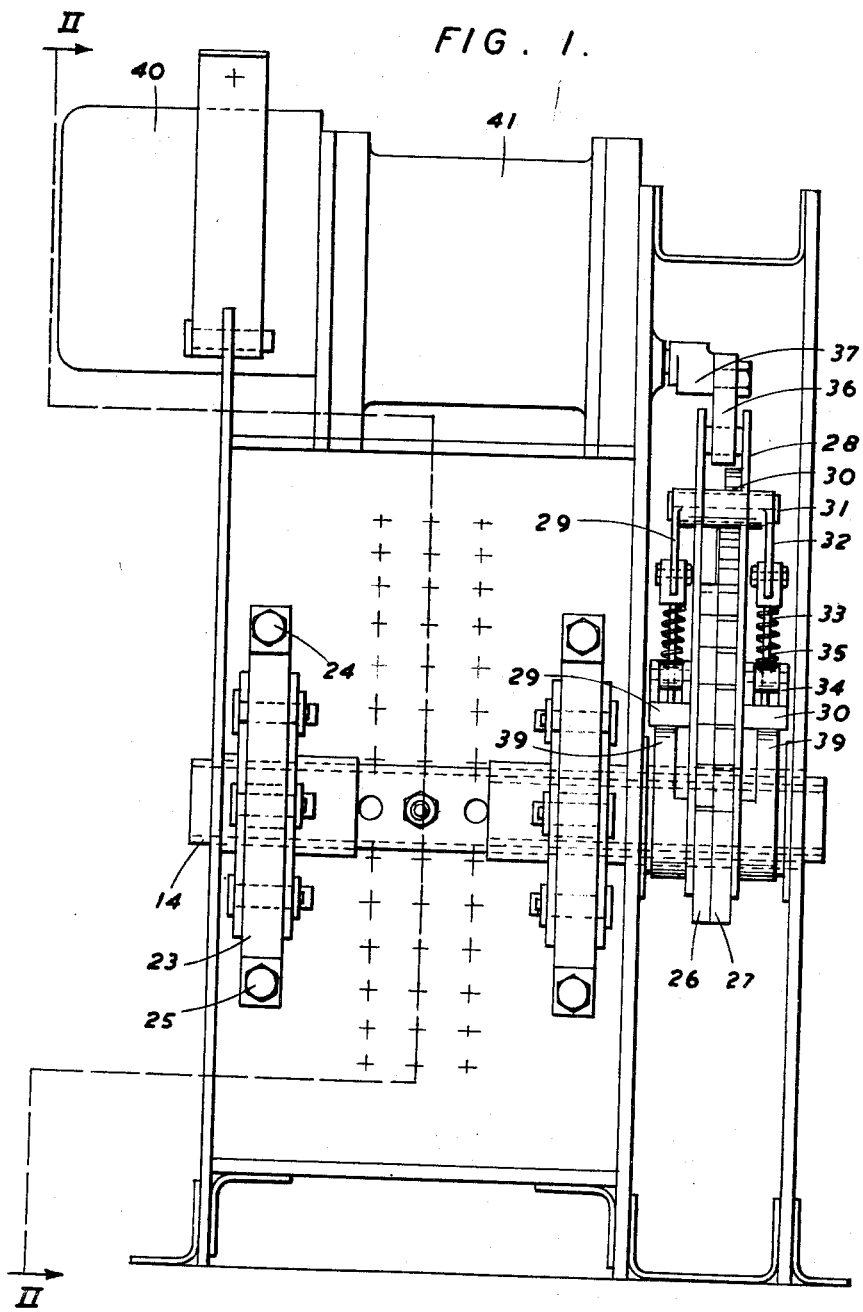

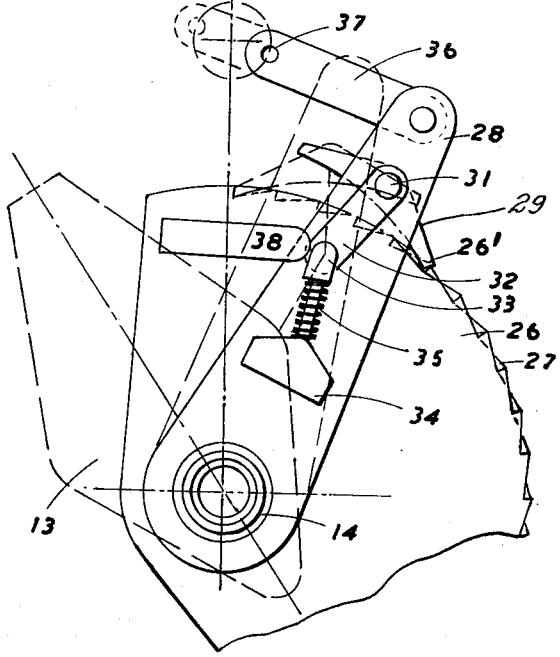
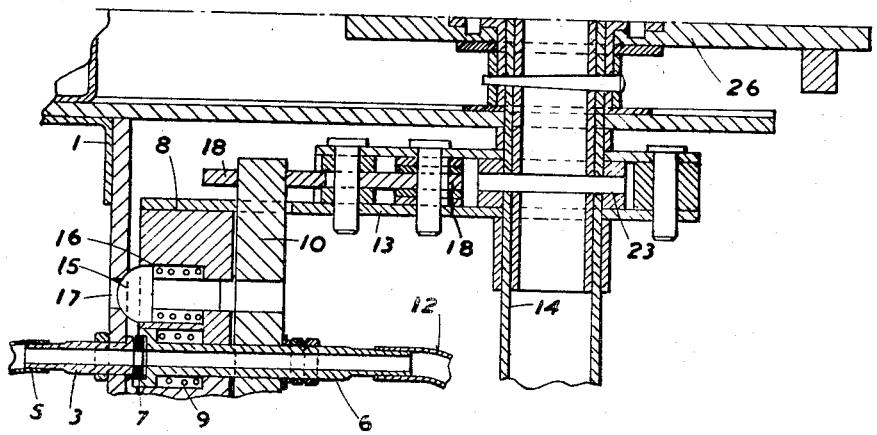

Patented Sept. 14, 1954

2,688,982

UNITED STATES PATENT OFFICE 2,688,982

SELECTIVE COUPLING MECHANISM FOR PNEUMATIC OR HYDRAULIC LINES

Kenneth Alfred Whitworth, Hull, England, assignor to Blackburn and General Aircraft Limited, Brough, England, a British company Application April 25, 1950, Serial No. 158,046

Claims priority, application Great Britain April 26, 1949

4 Claims. (Cl. 137—633)

This invention relates to selective coupling mechanisms for pneumatic or hydraulic lines.

In carrying out flying tests, particularly of aircraft wings, it is known to provide a number of small holes in the wing or other surface which are individually connected to pressure sensitive instruments which indicate the magnitude of the positive or negative pressure at the various holes. Large numbers of holes need to be used to obtain pressure characteristics across a wing at different distances therealong and as it is impracticable to carry the large number of instruments which would be required, it is customary to carry out tests at comparatively few holes during each flight with appropriate changes in the connections of the holes to the instruments during the intervals while the aircraft is on the ground. Apart from such change over being a tedious operation, it greatly prolongs the period required to carry out the complete test and there is also possibility of errors creeping in due to changes in atmospheric pressures or conditions occurring during the different flights.

Now the object of the present invention is to provide a substantially fluid tight selector coupling mechanism whereby pressure points such as the above mentioned holes in the surface of a wing or other aircraft structural part or in some other body and the lines or conduits therefrom may be arranged in groups any one of which may be connected at will to a pressure sensitive instrument or several groups so connected to a corresponding number of pressure sensitive instruments whereby all the pressure points or holes may be sequentially tested within a short period of time as during a single flight by simple actuation of such coupling mechanism.

To this end the selector coupling mechanism, according to the present invention comprises a row of ports any one of which may be resiliently engaged by a movable spring-loaded coupling the movement of which is effected by means which first lift the coupling off the port on which it is seated and then move it to position it over and allow it to spring into engagement with an adjacent port.

The several ports may be connected by lines or conduits to a corresponding number of pressure points such as holes in the surface of an aircraft wing or other structural part of an aeroplane or other body and the valve may be similarly connected to a pressure sensitive instrument whereby the one instrument may indicate the positive or negative pressure ruling at any one of the several pressure points or holes or each of them in turn by sequentially moving the coupling.

According to a further feature of the present invention, a plurality of rows of ports are provided and each line of ports in the several rows is traversed by a member carrying a corresponding number of couplings which are acted upon by common lifting means, whereby groups of pressure points or holes may be simultaneously tested by an appropriate number of instruments. There may, for example, be from five to twenty ports in a row and two to twenty rows of ports in a mechanism.

Still further according to the present invention the row or rows of ports are arranged as an arc and the means which carry and lift the couplings or valves are carried by arms which pivot on the axis of such arc.

In a preferred embodiment as applied to a selector coupling member with arcuately disposed ports, the lifting means are connected to a pair of levers pivoted to the carrying arms so that applied movement first rocks one of such pair of levers to lift the coupling or all the several valves and then moves the carrying arms to displace it or them over the adjacent port or ports.

The coupling carrying member may in accordance with yet a still further feature of the invention be provided at each end or at each end as well as intermediately with spring loaded detents engageable with arcuate rows of apertures or recesses for locating that member for the coupling or valves properly to engage the respective ports or lines of ports. The movable parts are moved through the appropriate angle to change the engagement of the coupling or valves from one port or line of ports respectively to the adjacent port or line of ports, conveniently from a remote point as by means of a power operated mechanism.

Still further according to the present invention the movable parts of the mechanism are moved by an electric motor driving an eccentric which rocks a lever carrying a pair of pawls engageable with a toothed quadrant to displace the same intermittently and thereby so move the movable parts of the mechanism to which such quadrant is connected. Preferably there will be two quadrants with teeth of opposite hand and the pawl will be duplicate to engage one or other quadrant to move the movable parts of the mechanism first in one direction and then in the other, when means are provided for changing the pawl engagement at the end of a traverse automatically to reverse the movement of the movable parts.

Preferably the ports have mushroom heads with a central orifice and each coupling has an inset resilient washer which makes fluid-tight or substantially fluid-tight contact with the head of the port with which it may engage. The lifting action of the coupling raises the washer clear of the port head before displacement and in this way damage to the washer which would occur if it were scraped across the port is avoided.

In order that the invention may be clearly understood and readily carried into effect, one convenient embodiment of the selector coupling is by way of example hereinafter more fully described with reference to the accompanying drawings which are given for purposes of illustration only and not of limitation.

Figure 2:
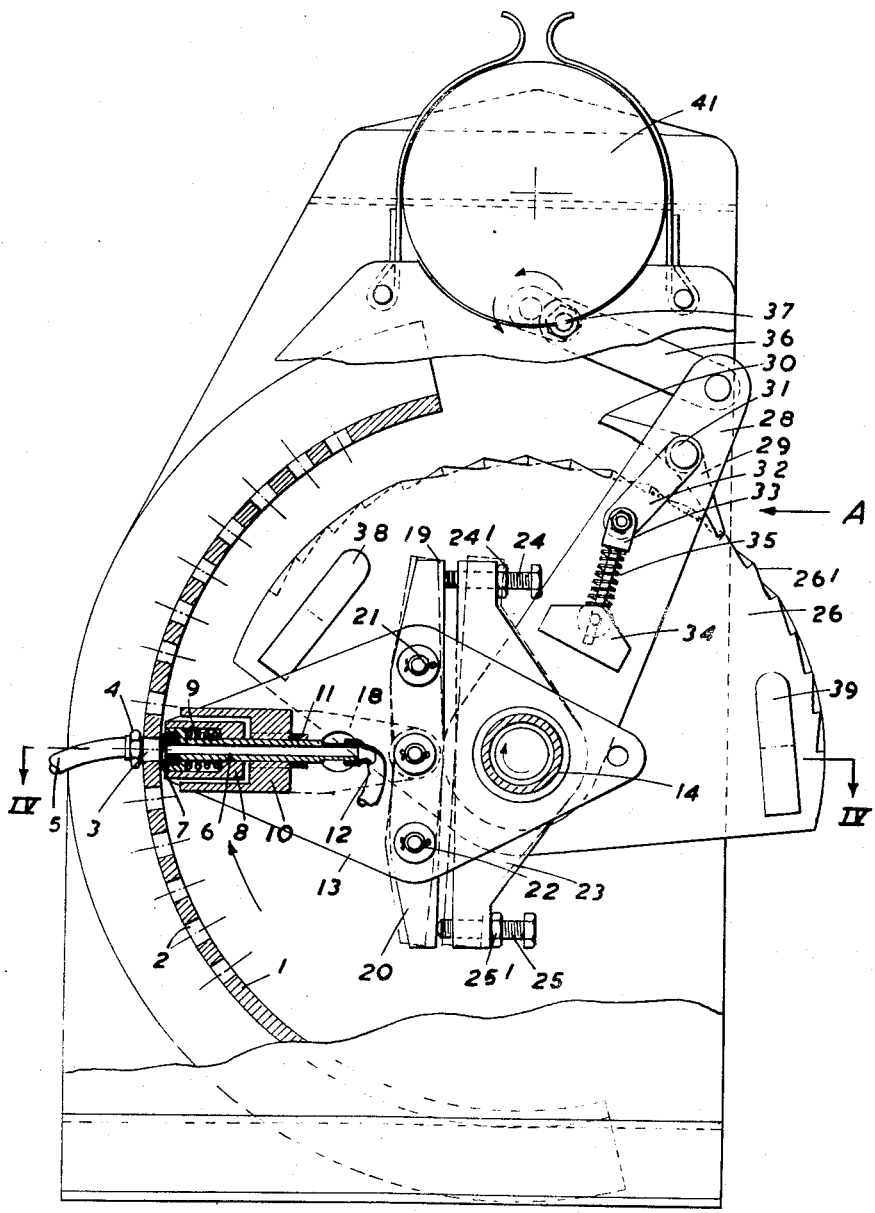

In these drawings:

Figure 1 is a front elevation of the apparatus being a view looking thereon in the direction of the arrow A of Figure 2, Figure 2 is an end sectional elevation being a view taken on the line II—II of Figure 1, Figure 3 is an enlarged detail view showing the driving mechanism at the completion of a traverse in one direction, and Figure 4 is a cross section taken on the line IV—IV of Figure 2.

Referring now to the said drawings, an arcuate plate 1 has a plurality of rows of bores or apertures 2 in each of which is a mushroom headed hollow port 3, each of which is retained in its bore 2 by a nut 4 and each such port 3 is individually connected by a separate rubber conduit 5 to a pressure point such as a hole in the wing or some other part of the aeroplane or other body about which information is desired concerning the positive or negative pressure ruling at that point under different conditions or due to movement thereof through the air.

For each row of ports 3 there is a coupling 6 provided with an inset rubber washer 7 intended to engage the mushroom head of a port 3. Each coupling 6 is carried by a member 8 and is urged to seat on a port 3 by a spring 9. Each coupling 6 also passes through a member 10 against which it is held fast by the locking nuts 11 such that displacement of an elongated member 10, (to the right seen in Figure 2) in the manner which will hereafter be explained, brings about a similar movement of the several couplings 6 against the action of their springs 9 and lifts their rubber washers 7 away from seating engagement on the mushroom heads of a line of ports 3. Rubber conduits 12 connects the respective couplings 6 each to a pressure sensitive instrument which will indicate the pressure ruling at the point to which a particular port 3 and conduit 5 is connected. When therefore, as in the embodiment illustrated, there are fourteen ports in a row, one pressure sensitive instrument is capable of indicating the pressure at fourteen different points. For each row there will be a separate pressure sensitive instrument, and therefore if the coupling mechanism has ten rows, there will be ten pressure sensitive instruments capable of dealing with the pressures at 140 different points.

The coupling carrying member 8 is supported at its ends by a pair of levers 13 which are freely rotatably mounted on a shaft 14. In order to provide for accurate alignment of the couplings with their respective ports at each of the several port engaging positions of the coupling carrying member 8, a round-ended detent member 15 is provided (Fig. 4) which is pressed by a compression spring 16 into an indentation provided by a chamfered orifice 17 formed in the arcuate plate 1. One such chamfered orifice 17 is provided for each port engaging position of the coupling carrying member 8. Preferably the chamfered orifices 17 are in alignment with each port or line of ports.

In the embodiment illustrated, the lifting member 10 is displaced to effect lifting of the coupling 6 by means of slidable members 18 at the ends thereof, each of which is connected to double levers 19, 20 respectively (Fig. 2) which pairs of levers are pivoted intermediate their ends at 21, 22 respectively to the arms 13. Fast on the shaft 14 and adjacent to the arms 13, are double-ended levers 23 through the ends of which extend adjusting screws 24, 25 which are held in position by lock nuts $24^1$, $25^1$ respectively. The ends of these screws 24, 25 bear on the double levers 19, 20 respectively, such that rocking movement of the double-ended levers 23 causes one or other of the screws 24, 25 according to the direction of movement, to thrust on one of the levers 19, 20 thereby rocking the same and by displacement of the members 18 move the lifting member 10 to lift the coupling 6 to unseat from the ports 3 with which they are in engagement.

Also fast on the shaft 14 are quadrants 26, 27 having oppositely directed ratchet teeth $26^1$ and $27^1$, respectively, formed therein. A lever 28, freely rotatable on the shaft 14 carries a pair of pawls 29, 30 fast on a common shaft 31. Also fast on the shaft 31 is a link 32 connected to a spring loaded link 33 capable of sliding and angular movement with respect to a part 34 mounted on the lever 28 and loaded by spring 35 so that the links 32, 33 have an over centre action, in one limit position with the pawl 29 working on the teeth $26^1$ of the quadrant 26 and in the other position with the pawl 30 effective on the teeth $27^1$ of the quadrant 27.

The free end of the lever 28 is connected by a link 36 to an eccentric or crank arm 37 which is driven by an electric motor 40 through reduction gearing in housing 41 such that the rotation of the eccentric or crank arm 37 acting through the link 36 rocks the lever 28 to and fro a distance sufficient for the pawls 29 slightly to exceed the pitch of the teeth $26^1$, $27^1$ of the quadrants 26, 27 such that such movement of the lever 28 first displaces the pawl so that it clicks over one tooth and then on reverse movement moves the quadrants 26, 27 by that amount which is sufficient to displace the levers 13 to move the coupling 6 from one line of ports 3 to the adjacent line after having first brought about the lifting movement described above.

The quadrant 26 carries abutments 38, 39 one or other of which on near completion of a traverse operation of the quadrants 26, 27 (see Figure 3) engages the links 32, 33 so that further movement of the lever 28 in the same direction throws these links over centre for the other pawl to become effective and move the quadrants 26, 27 in reverse direction.

As shown in Figure 2, the pawl 29 is effective on the teeth $26^1$ of the quadrant 26 and the reciprocation of the lever 28, by the rotating eccentric 37 through the link 36, is effective to advance the quadrants 26, 27 intermittently in clockwise direction and with them the movable parts of the mechanism, each initial advance movement rocking the part 23 to cause its screw 25 to rock the lever 20 and displace the member 18 so lifting the member 10 and the coupling 6 before further movement causes the part 23 to turn the members 18 to position the line of valves 6 over the adjacent line of ports 3 over which they are located by the detents 15 engaging the next aperture 17 prior to re-seating of the coupling 6 under the influence of their springs 9 on the motivating parts resuming their normal relative positions on cessation of the applied movement. This step-by-step movement with sequential engagement of the several ports in each row continues until the abutment 38 knocks the links 32, 33 over centre whereupon the pawl 29 becomes inoperative and the pawl 30 effective to engage the teeth 27¹ of the quadrant 27 and so move the parts in the opposite direction to complete a reverse operation when the abutment 39 now knocks the links 32, 33 back to their former position and the quadrants are again moved in clockwise direction.

I claim:

1. A selective coupling mechanism of the class described, comprising: a stationary member shaped to provide an internal surface forming at least a portion of a cylinder, said stationary member having ports therein terminating in a plurality of arcuate rows of spaced aligned apertures at said internal surface, the plane of said arc being perpendicular to the axis of said cylinder; a plurality of conduits individually communicating with said ports; a coupling carrying member fast with a shaft rotatable about said axis of said cylinder, a plurality of couplings corresponding in number to the number of said arcuate rows of apertures and carried by said carrying member for individual engagement with any selected line of said apertures; a plurality of flexible conduits individually communicating with said couplings; spring means for urging said couplings into engagement with said apertures in a line of said rows of apertures; means for moving all of said couplings radially against said spring means to disengage said couplings from said apertures; means for rotating said carrying member in either direction, step-by-step to an extent to displace said couplings from one of said lines of apertures to an adjacent line; and means effective on said coupling moving means and interposed between such means and said carrying member rotating means for disengaging said couplings from said line of apertures prior to response of said carrying member to said rotating means.

2. A mechanism according to claim 1, in which said stationary member has a row of spaced indentations formed therein, said row of indentations being parallel to said rows of apertures and said indentation spacing being the same as said aperture spacing, said mechanism further comprising detent means movable with said coupling carrying member and engageable with any one of said indentations for positioning said coupling for accurate engagement with said line of said apertures.

3. A mechanism according to claim 1, including driving means comprising two arcuate sectors fixed to said shaft and having oppositely directed ratchet teeth formed thereon, a reciprocable arm pivoted to said shaft, oppositely directed pawls carried by said arm and cooperating with said teeth; means for retaining one of said pawls in operative engagement with said teeth while rendering the other pawl inoperative; and means acting on said pawl retaining means and operative at predetermined limits of angular displacement of said shaft for rendering said operative pawl inoperative and said inoperative pawl operative, whereby said shaft will rotate through said predetermined angle of displacement alternately in one direction and then in the opposite direction through an integral number of said equal angular displacements.

4. A mechanism according to claim 3, further comprising motor driven means connected to said arm for the reciprocation thereof.

References Cited in the file of this patent

UNITED STATES PATENTS

| Number | Name | Date |
|---|---|---|
| 1,434,827 | Kronmiller | Nov. 7, 1922 |
| 1,976,417 | Steinberg | Oct. 9, 1934 |
| 2,125,513 | Martin | Aug. 2, 1938 |
| 2,235,287 | Daniels | Mar. 18, 1941 |
| 2,320,011 | Reynolds | May 25, 1943 |
| 2,327,046 | Hunter | Aug. 17, 1943 |
| 2,448,933 | Thomas | Sept. 7, 1948 |

FOREIGN PATENTS

| Number | Country | Date |
|---|---|---|
| 371,636 | France | Jan. 30, 1907 |